Dec. 25, 1945.  S. WISE  2,391,498
LOCKED FILLING CAP FOR FUEL TANKS
Filed May 9, 1941  2 Sheets-Sheet 1

INVENTOR.
SOLOMON WISE
BY Harry R. Canfield
ATTORNEY

Dec. 25, 1945.  S. WISE  2,391,498

LOCKED FILLING CAP FOR FUEL TANKS

Filed May 9, 1941  2 Sheets-Sheet 2

INVENTOR.
SOLOMON WISE
BY Harry P. Canfield
ATTORNEY.

Patented Dec. 25, 1945

2,391,498

UNITED STATES PATENT OFFICE 2,391,498

LOCKED FILLING CAP FOR FUEL TANKS

Solomon Wise, Shaker Heights, Ohio

Application May 9, 1941, Serial No. 392,673

5 Claims. (Cl. 70—172)

This invention relates to filling caps or closures for gasoline or like liquid fuel tanks, such for example as those provided on automotive vehicles, and to such caps as are locked against unauthorized removal by key-operated locks.

As is well-known, the liquid fuel tank of an automotive vehicle is filled through a tube or stem, which is thereafter closed by a detachable gasket-sealed cap to keep out dust, dirt, water and other foreign material and to prevent evaporation of the fuel.

It has been proposed to lock such filling caps to prevent their unauthorized removal the primary purpose of which of course is to prevent theft of the fuel.

The lock-protected cap of the present invention embodies improvements over prior caps of this general class as will be explained hereinafter.

It is among the objects of this invention:

To provide generally an improved filling cap of the locked class referred to;

To provide a lock type filling cap for the filling tube or stem of a fuel tank which may be substituted for the unlocked type with which the tank is customarily equipped and which will cooperate with the filling stem or tube in an improved manner to lock it thereon;

To provide a lock type filling cap of the class referred to constructed from a number of parts having improved means for assembling them together in a manner to prevent disassembling them to prevent unauthorized access to the fuel tank by forced disassembling of the cap parts;

To provide a lock type filling cap for fuel tanks comprising a reciprocable lock tongue having an improved crank pin type of movement and which, when in the cap-locking position, is prevented in an improved manner from being forcibly retracted to unlocking position by the application of external force;

To provide a lock type cap of the class referred to having a reciprocable locking bolt and improved means embracing the bolt whereby forced lateral movement thereof is prevented;

To provide a locking cap of the class referred to having a reciprocable locking bolt and improved means associated therewith to prevent forcing of the bolt, from a positively locked position;

To provide in a locking cap of the class referred to an improved locking mechanism and improved mode of operation thereof;

To provide a locking cap of the class referred to for lockingly engaging the end portion of a filling tube or stem and having an improved spring construction functioning to seal the end of the filling tube in an improved manner;

To provide for filling caps of the type comprising a gasket for sealing the end of a filling tube or stem and a spring for exerting sealing pressure, an improved spring and mode of operation thereof whereby sealing pressure on different parts of the gasket is equalized and whereby the strain in different parts of the spring is equalized;

To provide in a locking cap of the class referred to comprising a sealing gasket spring, an improved guard and retainer for the spring;

To provide a construction of sealing cap of the lock type for the filling tubes or stems of fuel tanks constructed in an improved manner whereby it may be adapted to different diametrical sizes of stems or tubes;

To provide a filling cap for fuel tanks of the lock type the parts of which will be cheap to manufacture and assemble and which will be durable and efficient in operation;

To provide a filling cap of the lock type referred to the parts of which are constructed in an improved manner whereby such parts may be manufactured in quantities and at the time of assembling the parts into the complete cap, the parts may be interchangeably selected to make up complete lock caps adapted to seal and lock tank filling tubes or stems of different diametrical sizes.

Other objects will be apparent to those skilled in the art to which my invention pertains.

My invention is fully disclosed in the following description taken in connection with the accompanying drawings in which:

Fig. 2 is related to Fig. 3 as indicated by the arrows 2—2;

Fig. 11 is a view similar to Fig. 2 but with some of the parts not in section, and showing the device in the unlocked position of the parts whereas Fig. 2 shows them in locked position;

Fig. 12 is a view similar to Fig. 4 but showing the parts in the unlocked position whereas Fig. 4 shows them in locked position;

Figure 4:
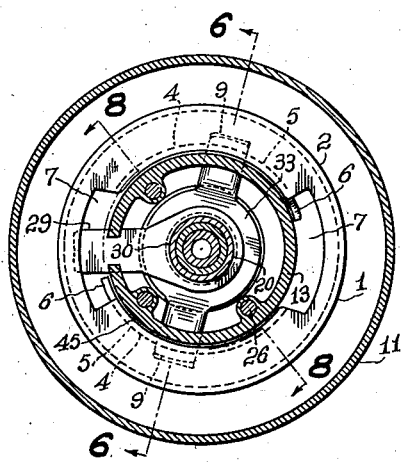
Fig. 4 is a cross sectional view taken from the plane 4—4 of Fig. 2.
Figure 2:
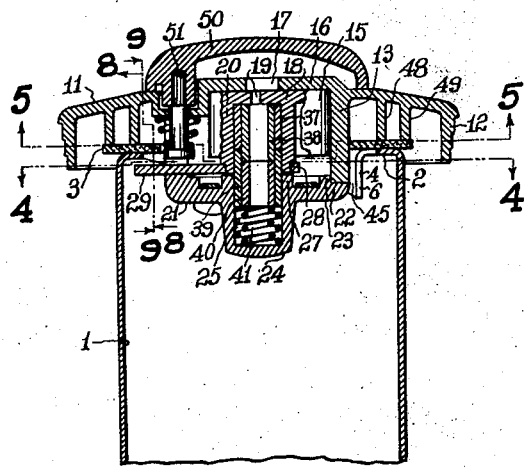
Fig. 2 is a longitudinal sectional view of a tank filling tube or stem with a lock cap embodying my invention attached thereto and locked thereupon.
Figure 8:
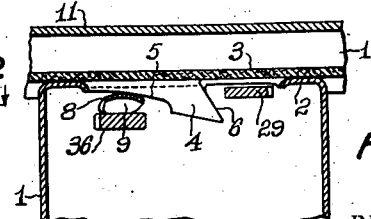
Fig. 8 is a fragmentary longitudinal sectional view taken from the plane 8—8 of Fig. 4 or Fig. 2 and illustrating the relative positions of a lock tongue, and a spring which I may employ and a part of the filling stem with which they cooperate.

Referring to the drawings I have shown at 1, see Figs. 2, 4, and 8, the filling tube or stem of a fuel tank, which customarily extends upwardly from the tank as illustrated, the tank not being shown. The upper edge of the stem is turned over providing a generally annular face 2 engageable by a sealing gasket 3 and then is bent inwardly to provide a diametrically opposite pair of flanges 4—4 the edges of which have inclined cam-shaped edges 5—5, the flanges 4 terminating circumferentially in shoulders 6. The face 2 at diametrically opposite portions is provided with openings 7—7. The stem thus described is the conventional form of stem customarily provided on fuel tanks of automotive vehicles.

The locked cap of this invention cooperates with the above-described parts of the stem and comprises a flat metal spring 8 having spring tongues 9—9 on the ends thereof, to attach the cap; and comprises a lock bolt 29, to lock it; and a gasket 3 to seal it. The lock bolt 29 is first retracted; the spring tongues 9—9 are inserted through the openings 7—7; and the device is turned to cause the spring tongues 9—9 to slide along the cam edges 5—5 to resiliently draw the gasket into sealing engagement with the face of the stem; and the lock bolt 29 is then operated to project it radially outwardly opposite the edge 6. If now the device be turned in one direction, the lock bolt 29 will be stopped upon the edge 6 and further movement prevented thereby and if it be turned in the other direction it will merely tighten the gasket tighter; and in either case the cap cannot be removed.

The parts for effecting this result will now be more fully described.

The device comprises generally a main body portion 11 in the nature of a cover for the operative parts and has a peripheral depending skirt 12, the body 11 and skirt 12 as well as other parts of the body to be referred to being preferably formed from die-cast metal.

Figure 5:
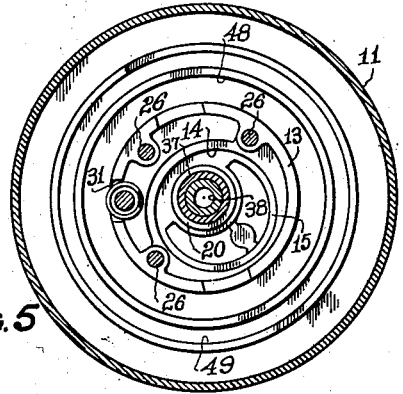
Fig. 5 is a cross sectional view taken from the plane 5—5 of Fig. 2.
Figure 3:
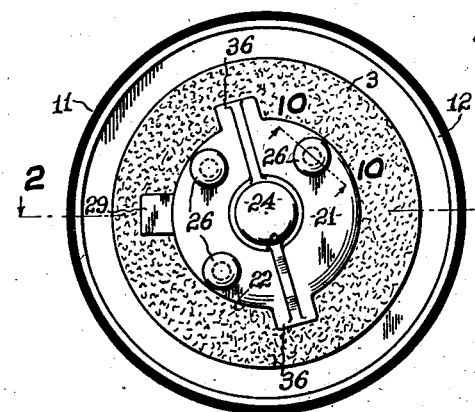
Fig. 3 is a bottom plan view of the lock cap of Fig. 2 but with the filling tube or stem omitted from the figure; and for convenience of reference.

Depending interiorly from the body 11 is a housing 13, generally of cylindrical form and open at its lower end and having therein a cylindrical bore 14 which is eccentric with respect to the axis of the body 11, Fig. 5. Within the bore 14 is oscillatably fitted a cylindrical key barrel 15. The outer end of the cylindrical housing 13 is closed as at 16 except for a key opening 17 and the oscillatable key barrel 15 is likewise closed at its outer end as at 18 except for a key slot 19; and in alignment with the key slot the barrel has a cylindrical bore or tube 20 depending axially therefrom.

The barrel 15 may be oscillated by a key as will be described and thereupon the tube 20 is given a lateral reciprocatory movement because of the eccentricity of the barrel to which it is connected or integrally with which it is formed, the barrel 15 being preferably formed as a die casting, this reciprocatory movement of the tube 20 being illustrated in going from Fig. 5 to Fig. 12. In the locked position of the device, the tube 20 is substantially co-axial with the cylindrical housing 13.

The lower end of the housing 13 has thereon a plate 21, permanently attached thereto and preferably in the form of a cover closing the end of the housing 13. The cover or plate 21 comprises a generally disc form body 22 having an annular flange 23 to center it within the cylindrical housing 13; and has centrally thereof a cup-like portion 24 depending therefrom internally provided with a bore 25; and the cover is, as mentioned permanently attached to the wall of the housing 13 by a plurality such as three securing devices 26—26. While the devices 26 are not accessible to manipulation by one attempting unauthorized removal of the cap, when in locked position, it is preferred nevertheless to render them tamper-proof and to this end are preferably of the type of device shown in Fig. 10 wherein as will be seen they are drive-screws of the type which, when projected through perforations in the part 21, and driven into bores in the part 13 by longitudinal pressure on the screw, cut their own corresponding threads on the wall of the bore. Such devices are known.

On the inside of the cover 21 it is provided with a short upwardly extending tube 27 co-axial with the bore 25; and the lower end of the tube 20 of the barrel 15 extends approximately to the tube 27, and the lower end of the tube 20 may be made of reduced diameter as at 28, Fig. 2 whereby its diameter is less than the outside diameter of the tube 27 of the cover. The locking bolt 29 is in the form of a piece of flat sheet metal enlarged at its inner end and having in the enlarged end a perforation 30 which substantially, but with suitable clearance, fits the reduced diameter portion 28 of the tube 20, and the short tube 27 of the cover 21 being of greater diameter than the reduced diameter portion 28 overlaps the perforation in the lock bolt 29, so that the bolt is entrapped in position on the lower end of the tube 20 of the oscillatory key barrel 15. This applies to the locked position of the parts in Fig. 2, the entrapping of the lock bolt in the unlocked and intermediate position being effected as will presently appear.

Figures 9, 10:
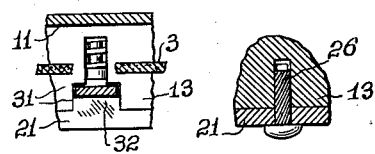
Fig. 9 is a fragmentary sectional view taken from the plane 9—9 of Fig. 2.
Fig. 10 is a fragmentary sectional view taken from the plane 10—10 of Fig. 3.

As shown in Fig. 2 and Fig. 9, the bolt, laterally of its perforation 30 referred to, is embraced in an opening which acts as a rigid guide therefor during its reciprocatory movement, the opening being provided by a notch 31 in the lower edge of the housing 13, see Fig. 9, and a lug 32 on the cover 21 extending upwardly into the notch 31.

The bolt 29 cannot move upwardly or laterally because of the walls of the notch 31 and cannot move downwardly because it rides upon the lug 32 but is free to reciprocate radially.

Figure 12:
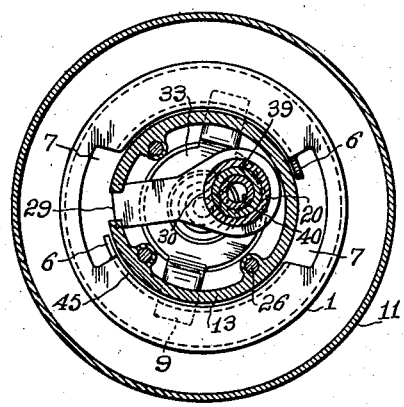

As will now be apparent, when the key barrel 15 is oscillated by the key as will be described to move the tube 20 from its co-axial position of Figs. 2 or 5 or 4 to the unlocked position of Fig. 12, the locking bolt 29 will be retracted from the locked position of Fig. 4 to the unlocked position of Fig. 12, and upon turning the barrel in the other direction it will be projected outwardly to the locking position; the mechanical movement of the locking bolt 29 and tube 20 corresponding somewhat to the movements of a connecting rod and crank pin, a well-known mechanical movement, but here being applied to what is believed to be a novel use.

Figure 6:
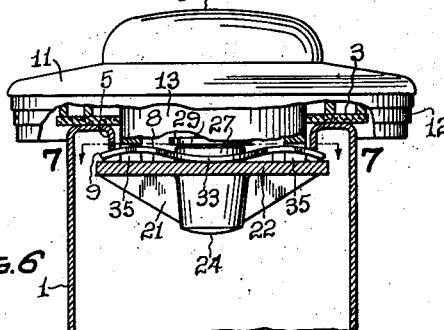
Fig. 6 is a view similar to Fig. 2 but with some of the parts not shown in longitudinal section, the view being taken on a plane at an angle to the sectional plane of Fig. 2; and the view may be considered as taken from the plane 6—6 of Fig. 4.

The gasket 3 is in general attached to the body 11 so that it will not fall out when the lock cap as a whole is removed from the filling cap, by being provided with a central perforation which snugly fits around the outer wall of the housing 13, see Fig. 6.

Figure 7:
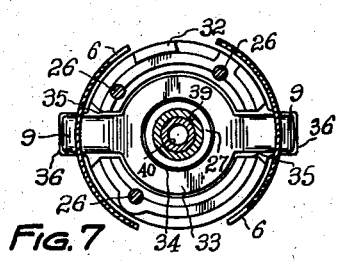
Fig. 7 is a cross sectional view taken from the plane 7—7 of Fig. 6.
Figure 15:
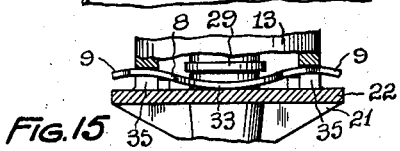
Fig. 15 is a fragmentary view similar to a part of Fig. 6 showing a spring which I may employ in untensioned condition, Fig. 6 showing the spring in tensioned condition.

The gasket sealing spring 8 above referred to, see Figs. 6 and 7, comprises, besides the diametrically opposite tongues 9—9 referred to, a central generally circular body portion 33 having a central perforation 34 telescoped over the short tube 27 of the cover 21 fitting the same, whereby it is entrapped against lateral or radial movement. The lower end of the housing 13 is provided with diametrically opposite notches 35—35 the lower ends of which are closed by the disc form body 22 of the cover 21. These covered and closed notches therefor constitute, in the assembled condition of the parts, perforations through which the ends or tongues 9 of the spring extend, and the spring is therefore trapped against rotary movement; but while the spring is thus positioned and trapped in the assembled device, it is loosely assembled therewith. As shown in Fig. 6 the central part of the spring is downwardly convex or bulged and this bulge rests upon the disc 22 of the cover 21, so that the spring can rock thereon, this being facilitated by its loose entrapped fit. The spring 8 is shown in Fig. 15 in its untensioned condition, and when the device is detached. When it is attached to the filling stem 1, as described above, with reference to Fig. 8, the ends 9 of the spring are bent downwardly as will be understood to provide the sealing pressure on the gasket 3, this condition being shown in Fig. 6.

It will be observed that the spring is not weakened by rivet or screw holes or the like therein for attaching it to anything, but has a floating connection with the parts with which it is assembled; and when it is subjected to tension in the operation thereof as described it may rock on the bulge 33 to adapt it or its position to irregularities in the cam edges 5 with which it engages, whereby one end of the spring will not be tensioned more than the other and overworked or crystallized which would tend to break it; and whereby also the tension in the two ends of the spring may be equal or substantially so resulting in equalized sealing pressure on the gasket. The disc portion 22 of the cover 21 extending outwardly under the ends of the spring prevents the spring ends from being beyond a predetermined amount, serving as a stop and limit therefor.

The cover 21 is preferably provided with lugs 36—36, diametrically opposite, and disposed under the ends 9—9 of the spring, to provide the above-described stop while maintaining the diameter of the disc 22 at the minimum, or at a diameter substantially the same as that of the housing 13.

As indicated in Fig. 4, the ends 9—9 of the spring are on a different diameter from that of the bolt 29; and as described above, there are lugs 36 on the cover under the spring ends and there is a lug 32 on the cover under the bolt. To facilitate disposing the cover 21 in the correct rotative position before assembling it as described, three devices 26 described above are provided, asymmetrically spaced, whereby there is only one position for the cover in which all three devices 26 may be inserted for assembling as described.

Figure 11:
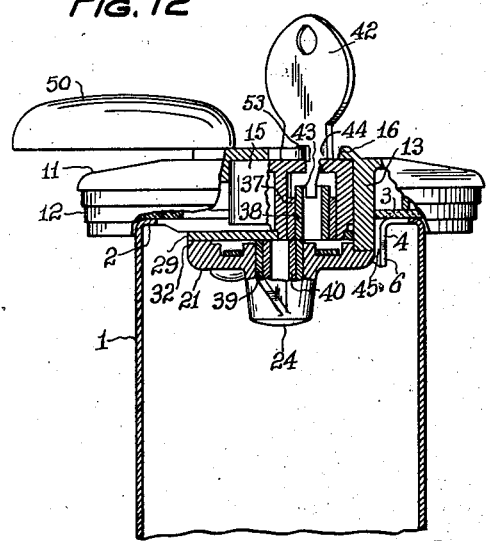

The locking mechanism, see Figs. 2 and 11, comprises a plurality of telescoped, co-axial elements 37, 38, 39 and 40 of different lengths disposed in the bore of the tube 20 on the barrel 15 and in the bore 25 of the cup 24 on the cover 21, and they normally overlap the plane determined by the adjacent ends of the tube 20 on the head and the tube 27 on the cover, and therefore lock the tube 20 against the lateral movement above-described for retraction of the lock bolt 29. The said telescoped elements are all retained upwardly in their said positions as viewed in Fig. 2 by springs 41 in the cup 24 engaging the lower ends of the said elements.

Figure 1:
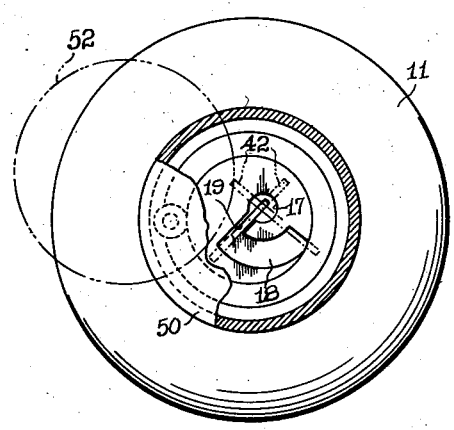
Fig. 1 is a top plan view of a lock cap embodying my invention with parts broken away and in section to expose to view the key hole of the lock.

A key 42, see Fig. 11, is formed to be inserted downwardly through the key opening 17, Fig. 2, and into the key slot 19, and when so inserted engages the upper ends of the telescoped elements 37 and 38, and downward force on the key moves all four of the said elements downwardly against the tension of the springs 41. The key is provided with the notches 43, Fig. 11, on its lower end which, when the key has been pushed in far enough to engage a shoulder 44 on the key with the upper surface of the end 18 of the key barrel 15, disposes the adjacent ends of the telescoped elements in the said plane between the parts 20 and 27 referred to above. The key may then be turned to rotate the key barrel 15 and thereby retract the lock bolt 29 as described, the locking parts moving to the position of Fig. 11 as will be understood, permitting the device as a whole to be rotated and removed from the filling tube 1. The key 42 is at this time interlocked with the end 16 of the housing 13 by the configuration of the key opening 17 and a perforation 53 in the key, as shown in Figs. 1 and 11 but which constitutes no essential part of the present invention, the same being described and claimed in my patent for improvements in lock protected filling caps for liquid fuel tanks, No. 2,303,594, December 1, 1942, to which reference may be had. In attaching the device to the filling tube 1 after it has been turned thereon to sealingly engage the gasket with the end of the tube as described, the key 42 may be turned in the other direction to project the locking bolt 29 outwardly to locking position as described, and to again align the locking elements in axial position as in Fig. 2 whereupon the springs 41 will move the said locking parts to their locking position illustrated in Fig. 2 and at the same time will eject the key as described in the above-mentioned co-pending application.

Figure 14:
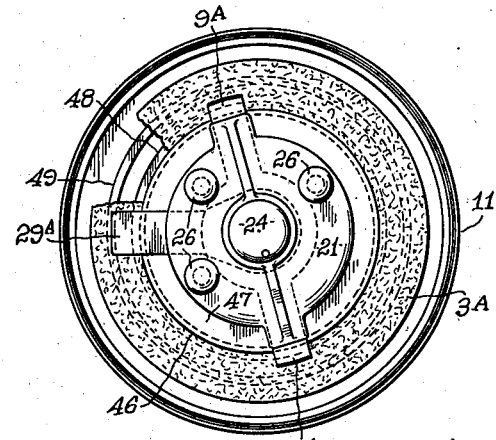
Fig. 13 and Fig. 14 are views respectively similar to Fig. 2 and Fig. 3 but illustrating an embodiment of my invention as adapted to a filling tube or stem or larger size than that of Fig. 2.

Filling tubes or stems 1 have been standardized in two commercial sizes as supplied with automotive vehicles and the invention as above-described applies to the one of smaller diameter. It is one of the advantages of my invention that it admits of being manufactured in different sizes for different sizes of stems with the minimum number of parts of different sizes. This will be described in connection with Figs. 13 and 14 which illustrate a larger size than that of the preceding figures.

The stem 1A has a larger opening at its outer end than the stem 1 and, to correspond therewith, the spring ends 9A extend outwardly radially farther than those of the spring 9 described but otherwise the spring and its mode of operation are the same.

The locking bolt 29A is longer than the bolt 29 but otherwise is the same.

Figure 13:
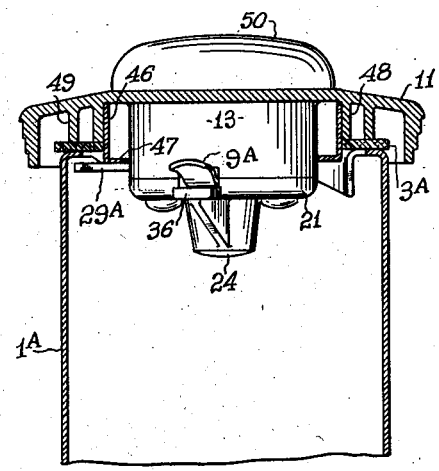

In the above-described form of Figs. 2 and 4 and as shown at 45, the housing 13 extends into and between the arcuate flanges 4—4, so that when the device is first put on preparatory to sealing it and locking it, it is thereby centered with respect to the end of the stem. To provide this centering action in the larger stem 1A, the body housing 13, Fig. 13, is not of large enough diameter. A sheet metal stamping 46 is therefore made, generally of cup-form and having a perforation in the cup bottom 47 which fits over the body housing 13 and the outside diameter of the stamping provides the aforesaid centering action.

The washer 3A has a larger central perforation to fit over the stamping 46.

The aforesaid four parts, the washer, the stamping, the lock bolt, and the spring, are therefore of different sizes from those of the first-described form. When the parts of the cap are manufactured, a quantity of those parts which are common to both sizes may be made up and corresponding smaller quantities of those parts individual to the two sizes are made up. At the time of filling an order, the manufacturer may take corresponding sets of parts and assemble them together and produce a lock cap embodying my invention of either size.

In order to provide the minimum of weight and die-cast material for the maximum of strength and correct functioning, the sealing gasket 3, see Fig. 2, rests upon an annular rib 48 depending like a skirt from the body 11 directly over the face 2 upon which it seals the gasket. A similar annular skirt 49 is provided for sealing the washer on the larger size of stem 1A as shown in Fig. 13, and the inner wall of the skirt 48 as shown in Fig. 13 may be utilized to accurately position the body of the stamping 46 when used.

A dust cap 50 may be provided to cover the key opening 17 and key slot 19, removable laterally around a pivot pin 51 to a position indicated at 52 in Fig. 1 to give access to the key hole. This dust cap constitutes no essential part of the present invention and is described and claimed in my co-pending application Serial No. 413,858 filed October 6, 1941 for improvements in lock type fuel tank filling caps, now patent No. 2,343,605, dated March 7, 1944, to which reference may be had. Other subject matter illustrated and described herein but not claimed is being claimed in my co-pending applications, Serial No. 619,808, filed October 2, 1945 and Serial No. 619,809, filed October 2, 1945.

My invention comprehends all changes and modifications of the foregoing disclosure which come within the scope of the appended claims.

I claim:

1. In a cap device for closing and sealing the end of a fuel tank filling stem, a body for covering and overlapping the end of the stem, a depending tubular housing on the body, downwardly open, and upwardly closed except for a key hole through the body, a cover plate on the downwardly open end of the tubular housing substantially closing the same and attached thereto, a bore in the housing, a lock barrel oscillatable in the housing bore by a key inserted through the key hole, a tube on the barrel eccentric thereof, a bore in the cover plate aligned with the tube in one position thereof, lock mechanism in the tube and cover plate bore to lock them in said position, an opening provided between the cover plate and the housing end, a lock bolt projecting outwardly through the opening and inwardly thereof having a perforation encircling the said tube, the lock mechanism being operable by the key to permit eccentric rotation of the tube by the key to withdraw the lock bolt.

2. In a cap device for closing the open end of a fuel tank filling stem, a main frame for covering the end of the stem, a tubular housing depending from the main frame, a lock bolt extending laterally out of the housing and lying in an open-mouthed recess in the lower end of the tubular housing, a plate on the lower end of the tubular housing having a lug thereon which in one rotated position of the plate on the end of the tubular housing projects into the said recess and closes its mouth and traps the lock bolt therein, means within the housing operable by a key to reciprocate the lock bolt in the recess, and means to attach the plate to the lower end of the tubular housing and to compel it to take up said one rotated position comprising a plurality of asymmetrically disposed recesses in the end of the tubular housing, and corresponding recesses in the plate alignable with the recesses in the tubular housing by rotation of the plate, and attaching devices projected through the perforations and into the recesses.

3. In a cap device for attachment to the open end of a fuel tank filling stem to close and seal it, a body for overlapping and covering the end of the stem and having a key hole therethrough, a depending housing on the body, a plate attached to the lower end of the housing, a lock barrel mounted in the housing for oscillation on an axis by a key projected through the key hole and into the lock barrel, means providing a bore in the barrel having its axis parallel to and spaced from the barrel axis, an annular tubular projection around the lower end of the barrel bore, a bore in the plate aligned with the barrel bore in one position thereof and having its upper end disposed adjacent to the lower end of the barrel bore, lock mechanism comprising a locking element in the barrel bore and plate bore overlapping their adjacent ends to lock the barrel in said position, a lock bolt projecting laterally from the housing and having a perforation encircling the said annular projection on the barrel, the locking element being movable by the key into the plate bore to free the barrel for oscillatory movement by the key to oscillate the annular projection and reciprocate the lock bolt.

4. In a cap device for attachment to the open end of a fuel tank filling stem to close and seal it, a body for overlapping and covering the end of the stem and having a key hole therethrough, a depending housing on the body, a plate attached to the lower end of the housing, a lock barrel mounted in the housing for oscillation on an axis by a key projected through the key hole and into the lock barrel, means providing a bore in the barrel having its axis parallel to and spaced from the barrel axis, an annular tubular projection around the lower end of the barrel bore, a bore in the plate aligned with the barrel bore in one position thereof and having its upper end disposed adjacent to the lower end of the barrel bore, lock mechanism in the barrel bore and plate bore to lock the barrel in said position, a lock bolt projecting laterally from the housing and having a perforation encircling the said annular projection on the barrel, the lock mechanism being operable by the key to free the barrel for oscillatory movement by the key to oscillate the annular projection and reciprocate the lock bolt.

5. In a cap device for covering and closing the open end of a tank filling stem; a main frame comprising a generally disc-form body, covering and overlapping the end of the stem and having a peripheral skirt depending therefrom; a downwardly open tubular housing depending from the body and integral therewith and substantially coaxial with the skirt; the body closing the upper end of the housing except for a key-hole therethrough communicating with the housing interior; a lock barrel oscillatable on an axis in the tubular housing by a key inserted through the key hole and into a recess provided in the barrel; a bore provided in the barrel having its axis spaced radially from the barrel axis so as to move arcuately around the barrel axis upon oscillation of the barrel; a cover plate on the end of the housing provided with a bore which is aligned with the barrel bore in one oscillated position of the barrel; lock mechanism in the two bores to lock the barrel in said position and operable by the key to release the barrel for oscillation by the key; a lock bolt having an outer end portion projecting laterally away from the housing and an inner end portion pivotally connected to the barrel for reciprocation of the lock bolt upon oscillation of the barrel, the pivot being eccentric with respect to the barrel axis.

SOLOMON WISE.